(12) United States Patent
Li et al.

(10) Patent No.: US 12,493,396 B2
(45) Date of Patent: Dec. 9, 2025

(54) METHOD AND APPARATUS FOR DISPLAYING APPLICATION INTERFACE, AND TERMINAL AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Han Li, Guangdong (CN); Fanxiu Kong, Guangdong (CN); Yilun Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 61 days.

(21) Appl. No.: 18/474,984

(22) Filed: Sep. 26, 2023

(65) Prior Publication Data
US 2024/0028180 A1      Jan. 25, 2024

Related U.S. Application Data

(63) Continuation of application No. PCT/CN2022/082231, filed on Mar. 22, 2022.

(30) Foreign Application Priority Data

Apr. 12, 2021   (CN) .................. 202110388973.7

(51) Int. Cl.
*G06F 3/04817* (2022.01)
*G06F 1/16* (2006.01)
(Continued)

(52) U.S. Cl.
CPC ........ *G06F 3/04817* (2013.01); *G06F 1/1641* (2013.01); *G06F 3/1446* (2013.01); *G06F 9/451* (2018.02)

(58) Field of Classification Search
CPC .. G06F 3/04817; G06F 3/1446; G06F 1/1641; G06F 9/451
See application file for complete search history.

(56) References Cited

U.S. PATENT DOCUMENTS 9,639,177 B2 * 5/2017 Kim ...................... G06F 3/1431
11,237,723 B2 * 2/2022 Seo ....................... G06F 3/0416
(Continued)

FOREIGN PATENT DOCUMENTS

CN    102004687 A    4/2011
CN    103530220 A    1/2014
(Continued)

OTHER PUBLICATIONS

International Search Report for Application No. PCT/CN2022/082231, mailed Jun. 2, 2022.
(Continued)

*Primary Examiner* — Tadesse Hailu
(74) *Attorney, Agent, or Firm* — Ladas & Parry, LLP

(57) ABSTRACT

A method and apparatus for displaying an application interface, and a terminal and a storage medium, which relate to the technical field of human-computer interaction. The method comprises: when a terminal with a foldable screen is in an unfolded state, displaying, in a first screen area, a target application interface of a target application program; when the terminal with a foldable screen is switched from the unfolded state to a folded state, stopping displaying the target application interface in the first screen area, and displaying, in a second screen area, a shortcut application icon of the target application program, wherein a display mode of the shortcut application icon is different from a display mode of a default application icon of the target application program; and in response to a trigger operation (Continued)

for the shortcut application icon, displaying the target application interface in the second screen area.

18 Claims, 13 Drawing Sheets

(51) Int. Cl.
*G06F 3/14* (2006.01)
*G06F 9/451* (2018.01)

(56) References Cited

U.S. PATENT DOCUMENTS

| | | | |
|---|---|---|---|
| 11,409,488 B2* | 8/2022 | Kwon | G06T 3/40 |
| 11,693,615 B2* | 7/2023 | Kaede | G06F 3/1446 |
| | | | 345/174 |
| 11,868,671 B2* | 1/2024 | Kwon | H04M 1/0268 |
| 2018/0039410 A1 | 2/2018 | Kim et al. | |
| 2020/0264826 A1* | 8/2020 | Kwon | G06F 21/629 |
| 2020/0401190 A1 | 12/2020 | Sim et al. | |
| 2022/0291811 A1* | 9/2022 | Zhang | G06F 1/1641 |
| 2023/0044497 A1* | 2/2023 | Zhang | G06F 1/1686 |

FOREIGN PATENT DOCUMENTS

| | | |
|---|---|---|
| CN | 107765968 A | 3/2018 |
| CN | 107943374 A | 4/2018 |
| CN | 109151170 A | 1/2019 |
| CN | 109409070 A | 3/2019 |
| CN | 109947319 A | 6/2019 |
| CN | 110673694 A | 1/2020 |
| CN | 112445276 A | 3/2021 |
| WO | 2022/218111 A1 | 10/2022 |

OTHER PUBLICATIONS

Written Opinion of International Searching Authority in International Application No. PCT/CN2022/082231, mailed on Jun. 2, 2022, with English translation provided by WIPO.
European Search Report, European Patent Application No. 22787340. 3, mailed Aug. 16, 2024 (8 pages).
Chinese First Office Action from corresponding Chinese Patent Application No. 202110388973.7, mailed Jul. 3, 2025, with search report (20 pages).
Chinese Second Office Action from corresponding Chinese Application No. 202110388973.7, mailed Oct. 30, 2025 (16 pages).

* cited by examiner

METHOD AND APPARATUS FOR DISPLAYING APPLICATION INTERFACE, AND TERMINAL AND NON-TRANSITORY COMPUTER-READABLE STORAGE MEDIUM

CROSS-REFERENCE TO RELATED APPLICATIONS

This present disclosure is a continuation-application of International (PCT) Patent Application No. PCT/CN2022/082231 filed Mar. 22, 2022, which claims priority to China Patent Applicant No. 202110388973.7, filed Apr. 12, 2021, the entire contents of which are hereby incorporated by reference in their entireties.

TECHNICAL FIELD

The present disclosure relates to the field of human-computer interaction technologies, and in particular to a method and an apparatus for displaying an application interface, and a terminal and a non-transitory computer-readable storage medium.

BACKGROUND

With a current development of technology, a terminal may display application interfaces via multiple screens. Taking a foldable screen as an example, the screen may display through a "small screen" mode when it is in a folded state, and display through a "big screen" mode when it is in an unfolded state.

When an application interface of a currently active target application is displayed through the "big screen", if the screen is folded, i.e. the screen of the terminal is switched from the "big screen" mode to the "small screen" mode, the target application may stop being displayed and the terminal may be transitioned into a "lock screen" state. If a user would like to re-launch the target application, the user may need to unlock the terminal first and then re-launch the application.

SUMMARY OF THE DISCLOSURE

Some embodiments of the present disclosure provide a method, a terminal, and a non-transitory computer-readable storage medium for displaying an application interface. The technical solutions may include the following.

In a first aspect, some embodiments of the present disclosure provide a method for displaying an application interface, and the method is performed by a foldable screen terminal. The foldable screen terminal may include a first screen area and a second screen area. A size of the first screen area may be greater than a size of the second screen area.

The method may include the following:
displaying a target application interface of a target application program in the first screen area in a case where the foldable screen terminal is in an unfolded state;
stopping displaying the target application interface in the first screen area, and displaying a shortcut application icon of the target application program in the second screen area, in a case where the foldable screen terminal is switched from the unfolded state to a folded state. The shortcut application icon may be displayed in a manner different from a default application icon of the target application program; and
displaying the target application interface in the second screen area, in response to a trigger operation applied to the shortcut application icon.

In a second aspect, some embodiments of the present disclosure further provide a terminal and the terminal may include a processor and a memory. The memory may store at least one instruction. The processor is caused to perform the method for displaying an application interface as described above, when the at least one instruction is executed by the processor.

In a third aspect, some embodiments of the present disclosure further provide a non-transitory computer-readable storage medium and the non-transitory computer-readable storage medium may store at least one instruction. A processor is caused to perform the method for displaying an application interface as described above, when the at least one instruction is executed by the processor.

BRIEF DESCRIPTION OF THE DRAWINGS

In order to clearly illustrate the technical solutions in the present disclosure, the following briefly illustrates drawings associated with embodiments of the present disclosure. Obviously, the drawings described as follows are only for some embodiments of the present disclosure. For an ordinary skilled in the art, other drawings may be derived based on the following drawings without creative work.

DETAILED DESCRIPTION

To clarify the purposes, technical solutions, and advantages of the present disclosure, various embodiments of the present disclosure will be further described in detail based on the drawings.

Figure 1:
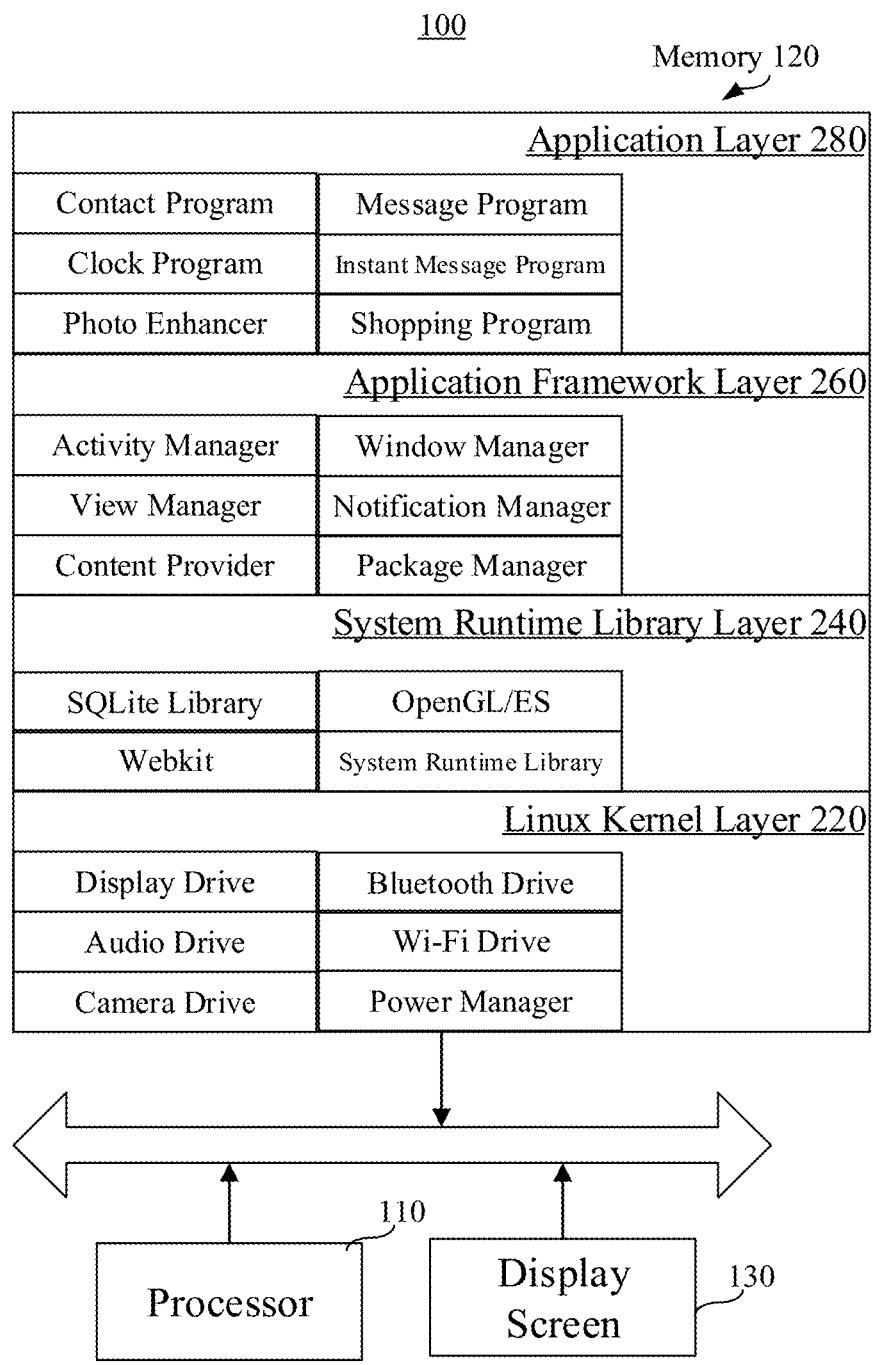
FIG. 1 is a structural block view of a terminal according to an embodiment of the present disclosure.
Figure 2:
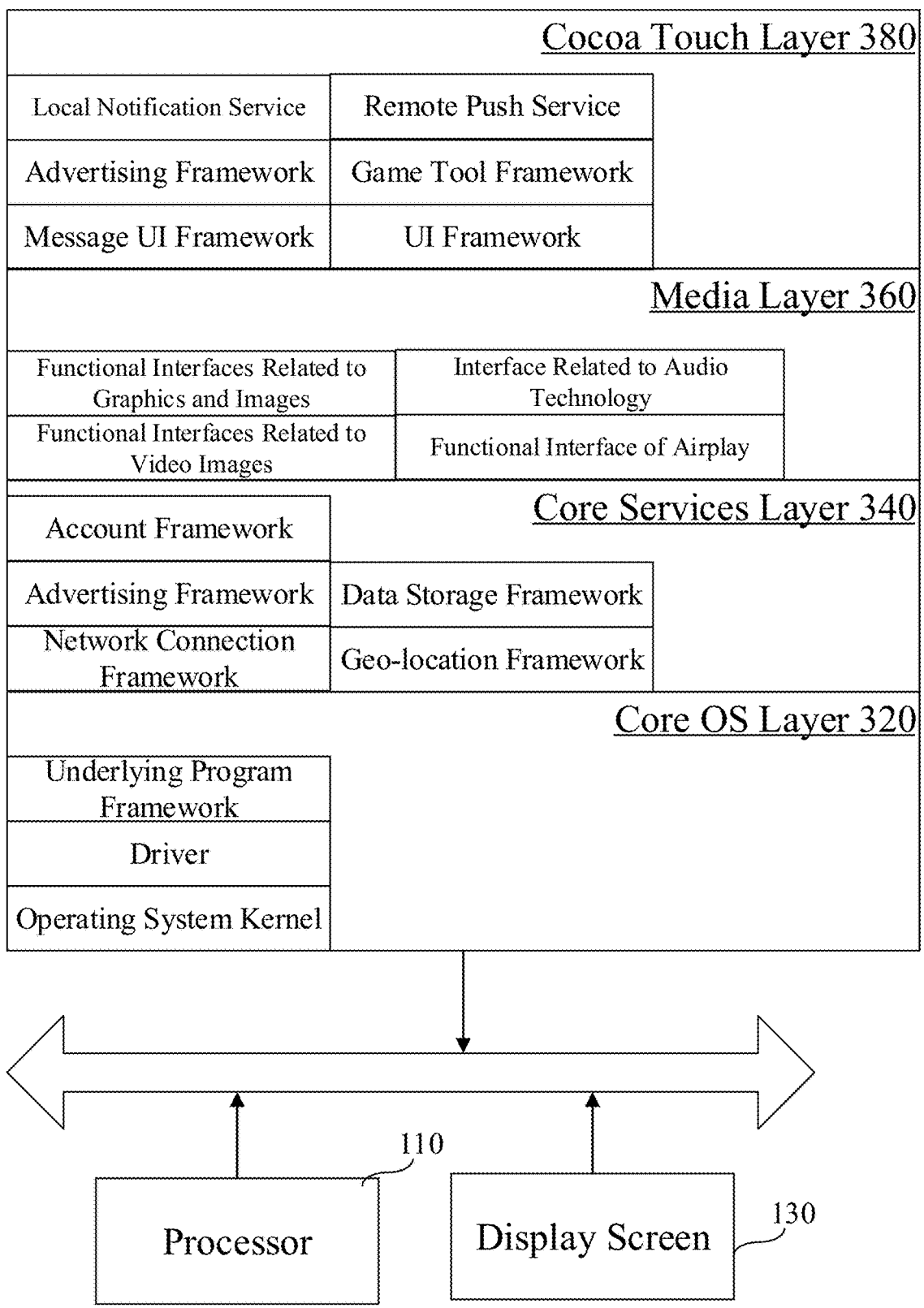
FIG. 2 is a structural block view of a terminal according to another embodiment of the present disclosure.

As shown in FIG. 1 and FIG. 2, a structural block view of a terminal 100 according to an embodiment of the present disclosure is provided. The terminal 100 may be a smart phone, a tablet, an e-reader, or so on. The terminal 100 in the present disclosure may include one or a combination of the following components: a processor 110, a memory 120, and a display screen 130.

The processor 110 may include one or more processor cores. The processor 110 may be configured to perform various functions provided by the terminal 100 and process data through utilizing interfaces and wiring to connect various components throughout the terminal 100, running or executing instructions, programs, code sets, or instructions sets stored in the memory 120, as well as calling data stored in the memory 120. In some embodiments, the processor 110 may be implemented in at least one form of hardware as follows: a Digital Signal Processing (DSP), a Field-Programmable Gate Array (FPGA), and a Programmable LogicArray (PLA). The processor 110 may integrate one or a combination of a Central Processing Unit (CPU), a Graphics Processing Unit (GPU), a modem, and so on. The CPU may primarily deal with operating systems, user interfaces and application programs, etc.; the GPU may be responsible for rendering and drawing content required be displayed by a touch display screen 130; and the modem may handle wireless communication. It should be understood that the modem does not have to be integrated into the processor 110 and may instead be implemented via a chip alone.

The memory 120 may include Random Access Memory (RAM). The memory 120 may also include Read-Only Memory (ROM). In some embodiments, the memory 120 may include a non-transitory computer-readable storage medium. The memory 120 may be configured to store instructions, programs, code, code sets, or instruction sets. The memory 120 may include a program storage area and a data storage area. The program storage area may be configured to store instructions for implementing the operating systems, instructions for at least one function (e.g. a touch function, an audio playback function, and an image playback function, etc.), instructions for implementing each embodiment described below, and so on. The data storage area may be configured to store data created based on operations applied to the terminal 100 (e.g. audio data and phonebook), etc.

Taking an Android operating system as an example, programs and data stored in the memory 120 are shown in FIG. 1. The memory 120 may store a Linux kernel layer 220, a system runtime library layer 240, an application framework layer 260, and an application layer 280. The Linux kernel layer 220 may provide underlying drives for various hardware of the terminal 100, such as a display drive, an audio drive, a camera drive, a Bluetooth drive, a Wi-Fi drive, a power management, and so on. The system runtime library layer 240 may provide a main feature support for the Android system through some C/C++ libraries. For example, a SQLite library may support a database feature, an OpenGL/ES library may support a 3D drawing feature, and a Webkit library may support a browser kernel feature. The system runtime library layer 240 may also provide an Android Runtime library, primarily providing some core libraries that may allow developers to write Android applications using Java. The application framework layer 260 may provide various Application Programming Interfaces (API) for building applications. Developers may also build their own applications by using these APIs, such as an activity manager, a window manager, a view manager, a notification manager, a content provider, a package manager, a call manager, a resource manager, and a location manager. The application layer 280 may run at least one application. The at least one application may be built-in in the operating system, such as a contact book, a message program, a clock, a camera, etc. In some embodiments, the at least one application may also be developed by third-party developers, such as an instant message program and a photo enhancer, etc.

Taking an iOS operating system as an example, the programs and data stored in the memory 120 are shown in FIG. 2. The iOS system may include: a core OS layer 320, a core services layer 340, a media layer 360, and a cocoa touch layer 380. The core OS layer 320 may include an operating system kernel, drivers, and underlying program frameworks that provide hardware-like functionality for program frameworks located in the core services layer 340. The core services layer 340 may provide system services and/or program frameworks required by applications, such as a foundation framework, an account framework, an advertising framework, a data storage framework, a network connection framework, a geolocation framework, and a motion framework, etc. The media layer 360 may provide audio-related and visual-related interfaces for applications, such as interfaces related to graphics and images, interfaces related to audio technology, interfaces related to video technology, and interfaces for audio and video transmission technology (i.e. AirPlay), etc. The cocoa touch layer 380 may provide a variety of commonly used interface-related frameworks for application development. The cocoa touch layer 380 may be responsible for user's touch interactions on the terminal 100 and may include, for example, a local notification service, a remote push service, an advertising framework, a game tool framework, a message user interface (UI) framework, a user interface UIKit framework, and a map framework, etc.

Frameworks shown in FIG. 2 that are relevant to most applications may include, but not be limited to, the foundation framework in the core services Layer 340 and the UIKit framework in the cocoa touch layer 380. The foundation framework may provide many basic object classes and data types, in order to offer the most basic system services for all applications without UI. The UIKit framework, on the other hand, may provide classes that are basic UI class libraries for creating user interfaces based on touch operations. An iOS application may provide UI based on the UIKit framework, so the iOS application may provide an application infrastructure for building user interfaces, drawing and handling user interaction events, and responding to gestures, etc.

The display screen 130 may display application interfaces of each application. When the display screen 130 is touch-enabled, it may also be configured to receive touch operations applied on or near it by users using a finger, a stylus, or any other suitable objects.

Figure 3:
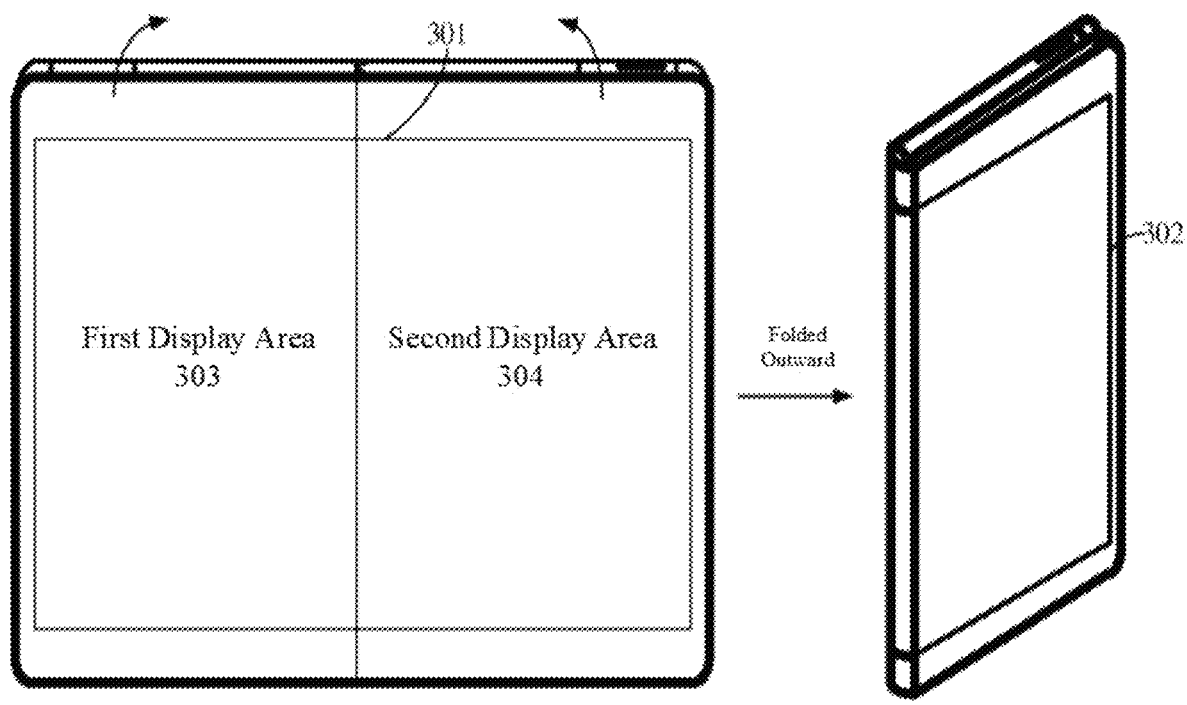
FIG. 3 is a schematic view of an outward foldable screen terminal according to an embodiment of the present disclosure.

In some embodiments, the display screen 130 may include a first screen area and a second screen area. In some embodiments, the terminal may be provided as an inward foldable screen terminal or an outward foldable screen terminal. When the terminal is provided as the outward foldable screen terminal, the first screen area and the second screen area may belong to an identical screen. The first screen area may be provided as a complete screen area, while the second screen area may be provided as a partial screen area. In some embodiments, as shown in FIG. 3, when the outward foldable terminal is unfolded, a first screen area 301 may be provided as a plane or flat, and including a first display area 303 and a second display area 304; and when the outward foldable screen terminal is folded, the second screen area 302 may be configured to display. The second screen area 302 may be the first display area 303 or the second display area 304.

Figure 4:
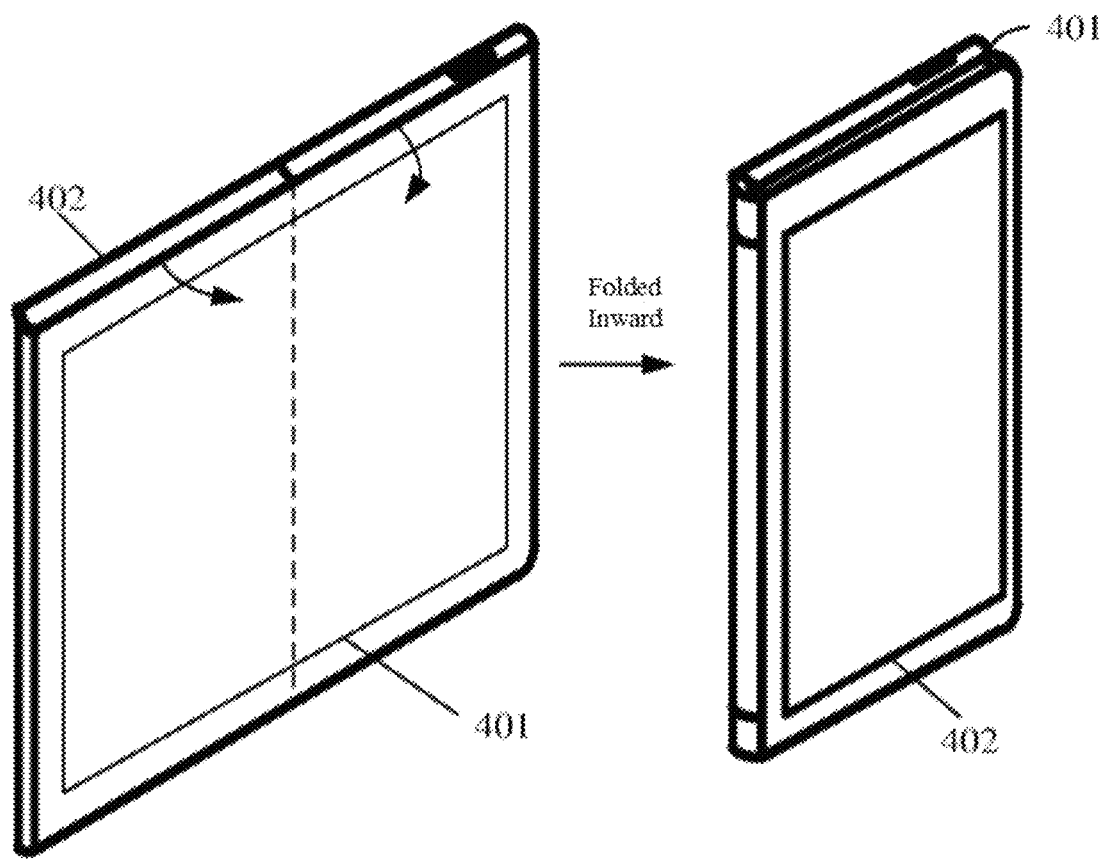
FIG. 4 is a schematic view of an inward foldable screen terminal according to an embodiment of the present disclosure.

When the terminal is provided as the inward foldable screen terminal, the first screen area and the second screen area may be configured to be independent screens. In some embodiments, as shown in FIG. 4, when the inward foldable screen terminal is unfolded, the first screen area 401 may be provided as a plane. In this case, the first screen area 401 and the second screen area 402 may be exposed, and the second screen area 402 may be provided behind the first screen area 401. When the inward foldable screen terminal is folded, the first screen area 401 may be folded and not exposed, while the second screen area 402 may be exposed. A user may switch the foldable screen between an unfolded state and a folded state based on their needs. For example, when the user is not using the terminal, the terminal may be folded to be more portable. When the user would like to watch a video, the terminal may be unfolded.

In order to fold the display screen, in a possible embodiment, when the terminal is provided as the outward foldable screen terminal, the screen may be made of flexible materials with a certain degree of stretching and ductility, or a curved area of the screen may be made of the flexible materials. When the terminal is an inward foldable screen terminal, a screen corresponding to the first screen area may be made of the flexible materials, or the curved area may be made of the flexible materials.

As shown in FIGS. 3 and 4, only a case where the display screen 130 includes two screens is illustrated as an example. In some other embodiments, the display screen 130 may include n (where n≥3) screens, thereby a terminal with an n−1 folding structure may be realized. The present disclosure does not limit a number of screens included.

In some embodiments, the terminal 100 may provide at least one other component. The at least one other component may include: a camera, a fingerprint sensor, an optical proximity sensor, and a distance sensor, etc. In some embodiments, the at least one other component may be configured at a front, a side, or a back of the terminal 100. For example, the fingerprint sensor may be disposed on the back cover or the side, and the camera may be configured on a side of the display screen 130.

In some other embodiments, the at least one other component may be integrated inside or underneath the display screen 130. In some embodiments, a bone-conducting receiver may be disposed at an interior of the terminal 100; other components on a front panel of a conventional terminal may be integrated in all or a part of an area of the display screen 130. For example, after splitting a light-sensitive element in the camera into a plurality of light-sensitive pixels, each of the plurality of light-sensitive pixels may be integrated in a black area in each the display pixel in the display screen 130, so that the display screen 130 may be configured to capture an image. The terminal 100 may have a higher screen-to-body ratio through integrating the at least one other component inside or underneath the display screen 130.

In some embodiments, an edge touch sensor may be configured on a single side, two sides (e.g. left and right sides), or four sides (e.g. top, bottom, left, and right sides) of a middle frame of the terminal 100. The edge touch sensor may be configured to detect at least one operation applied to the middle frame by the user, such as a touch operation, a tap or click operation, a press operation, and a swipe operation, etc. The edge touch sensor may be a touch sensor, a heat sensor, a pressure sensor, or so on. The user may apply the at least one operation to the edge touch sensor to control the applications provided by the terminal 100.

Furthermore, the skilled in the art should understand that a structure of the terminal 100 illustrated in the aforementioned drawings may not limit the terminal 100. The terminal may include more or fewer components than illustrated, a combination of certain components, or a different arrangement of components. For example, the terminal 100 may also include components such as a radio frequency (RF) circuit, an input unit, an audio circuit, a Wireless-Fidelity (Wi-Fi) module, a power supply, and a Bluetooth module, etc., which will not be described herein.

Figure 5:
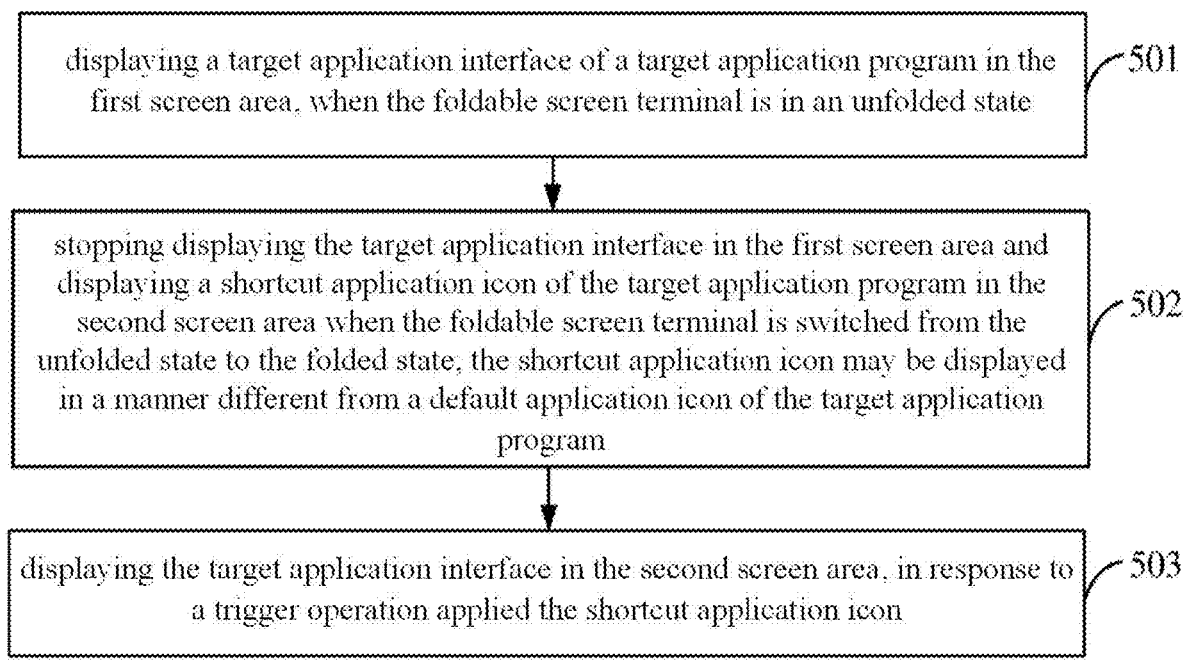
FIG. 5 is a flowchart of a method for displaying an application interface according to an embodiment of the present disclosure.

As shown in FIG. 5, a flowchart of a method for displaying an application interface according to an embodiment of the present disclosure is illustrated. The method may be performed by a foldable screen terminal, and the foldable screen terminal may include a first screen area and a second screen area. A size of the first screen area may be greater than that of the second screen area. The method includes the following operations at blocks illustrated in FIG. 5.

At block 501: displaying a target application interface of a target application program in the first screen area, in a case where the foldable screen terminal is in an unfolded state.

In some embodiments of the present disclosure, the unfolded state refers to a state in which the first screen area is provided as a plane or flat, and the terminal may determine whether the terminal is in the unfolded state by detecting whether all parts of the first screen area are located in a same plane. As shown in FIG. 3, the first screen area 301 may include a first display area 303 and a second display area 304. When an included angle between the first display area 303 and the second display area 304 is 180°, it may be determined that the foldable screen terminal is in the unfolded state. Accordingly, as shown in FIG. 4, the terminal may be determined to be in the unfolded state when every part of a first screen area 401 cooperatively form a same plane.

In a possible embodiment, when the foldable screen terminal is in the unfolded state, the target application interface of the target application program, i.e. the currently active application, may be displayed in the first screen area.

In some embodiments, the target application program may be any one of the applications installed in the terminal, including built-in applications and third-party applications. The embodiments of the present disclosure do not limit a type of the target application program.

Figure 6:
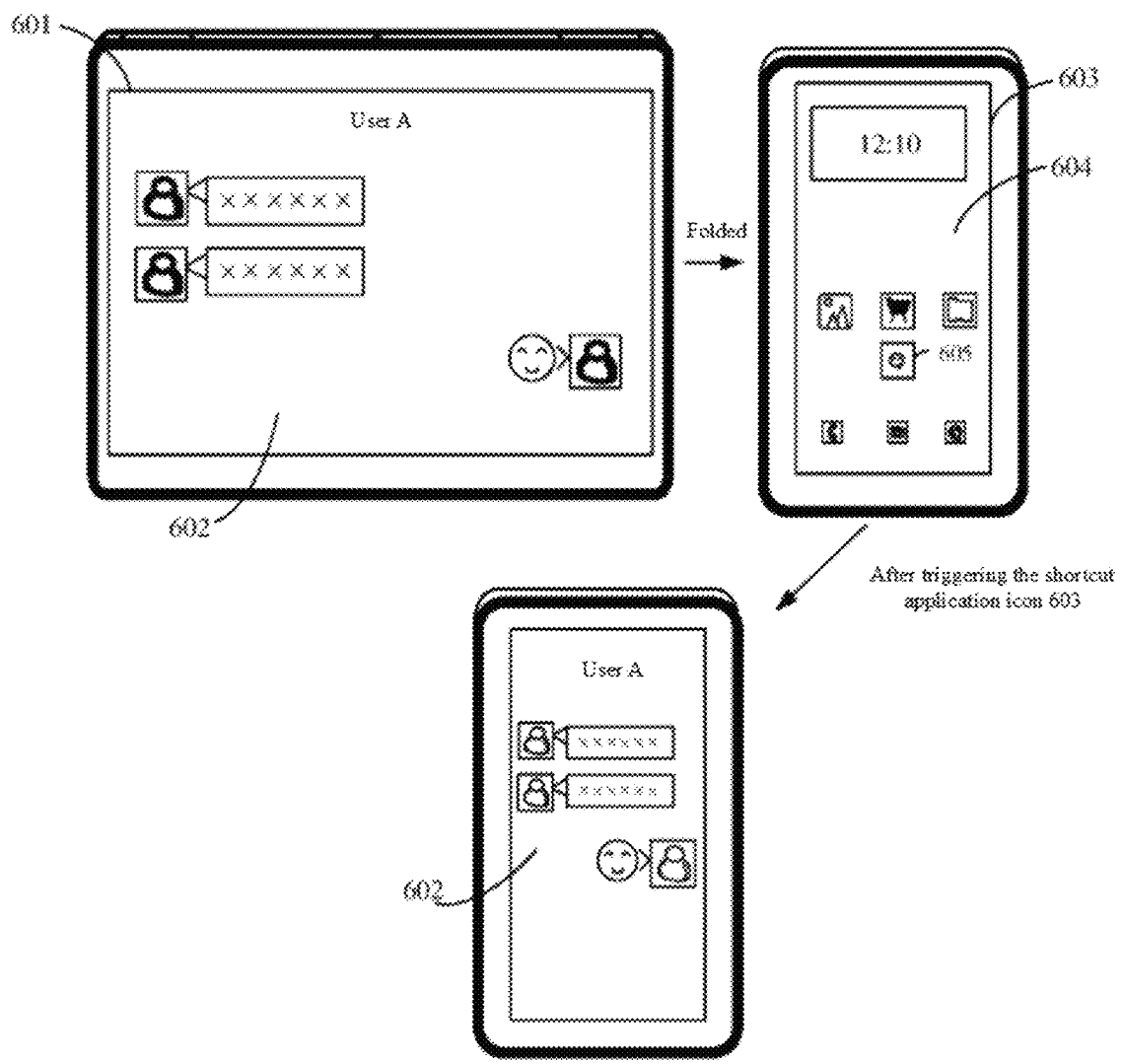
FIG. 6 is a schematic view illustrating an interface in a process of displaying an application interface according to an embodiment of the present disclosure.

In some embodiments, as shown in FIG. 6, the target application program may be an instant message program. When the terminal is in the unfolded state, a target application interface 602 of the target application program may be displayed in a first screen area 601.

At block 502: when the foldable screen terminal is switched from the unfolded state to a folded state, stop displaying the target application interface in the first screen area and displaying a shortcut application icon of the target application program in the second screen area. The shortcut application icon may be displayed in a manner different from a default application icon of the target application program.

In some embodiments of the present disclosure, the folded state refers to a state in which an included angle between every two parts of the first screen area is less than a first angle. In some embodiments, the first angle may be an angle defaulted by the terminal or a user-defined angle. For example, the first angle may be 90°. In some embodiments, as shown in the foldable screen terminal in FIG. 3, when the terminal is in the folded state, an angle between the first display area 303 in the first screen area and the second display area 304 in the first screen area may change. When the angle is less than 90°, it may be determined that the terminal is in the folded state.

When the foldable screen terminal is switched from the unfolded state to the folded state, it may indicate that the user no longer uses the target application program or the user may want to use the target application program through the second screen area. If the target application program is needed to be provided through the second screen area, a size of the target application interface may need to be adjusted. If the size of the target application interface is not able to be adjusted at runtime, the target application interface may not be displayed normally and thus the target application program may not be used normally. Therefore, in related art, after stopping displaying the target application interface, the user may need to re-launch the target application program through an icon of the target application program. In some embodiments, the user may need to search for the icon of the target application program in a page displayed in the second screen area and launch the target application program by a trigger operation. In some embodiments, the user may also re-launch the target application program from a backend multitasking management interface to continue using the target application program. However, it may be a cumbersome process to re-launch the target application program by searching for the icon of the target application program among tons of icons or opening the backend multitasking management interface to look for the target application program. In some embodiments of the present disclosure, in order to avoid searching for the corresponding icon of the target application program, after the foldable screen terminal is switched to the folded state, the shortcut application icon of the target application program may be displayed in the second screen area for the user to trigger the icon conveniently.

In some embodiments, the shortcut application icon may be displayed differently comparing to the default application icon of the target application program. In a possible embodiment, the shortcut application icon and the default application icon may be displayed in different forms. For example, to facilitate the user to trigger the icon, an indicator may be added to the default application icon, the default application icon may be enlarged, or the default application icon may be displayed dynamically. In another embodiment, the shortcut application icon and the default application icon may be displayed in different locations. For example, the default application icon may be presented at a desktop menu bar, while the shortcut application icon may be presented at a dock bar or a lock screen interface, etc.

In some embodiments, as shown in FIG. 6, when the foldable screen terminal is in the folded state, a main interface 604 may be displayed in the second screen area 603. The main interface 604 may include a shortcut application icon 605 corresponding to the target application program.

At block 503: in response to a trigger operation applied to the shortcut application icon, displaying the target application interface in the second screen area.

When the user triggers the shortcut application icon, the target application interface may be displayed in the second screen area. In some embodiments, the trigger operation may be at least one of the follows: a click operation, a hold operation, and a swipe operation. The present disclosure does not limit the specific form of the trigger operation.

In a possible embodiment, the target application interface provided in the second screen area may display a same content as what was displayed when the target application interface was stopped displaying in the first screen area. In some embodiments, as shown in FIG. 6, the target application interface 602 may continue to be displayed in the second screen area 603 after the user triggers the shortcut application icon 605.

In summary, in some embodiments of the present disclosure, when the application interface of the target application program is displayed in the first screen area of a greater size, if the terminal is folded, the application interface of the target application program may be stopped displaying in the first screen area and instead be displayed in the second screen area. At this time, the shortcut application icon of the target application program may be provided in the second screen area. The user may cause the terminal to display the application interface of the target application program in the second screen area by triggering the shortcut application icon, avoiding searching for the default application icon again to re-launch the application after the terminal is folded. By adopting a method provided by some embodiments of the present disclosure, it may be convenient for the user to continue to use the target application program via the second screen area, realizing an application relay between different screens in the foldable screen terminal, simplifying a process of the application relay, and thus improving the efficiency of launching the application interface.

In some embodiments, the operation for displaying the shortcut application icon of the target application program in the second screen area may include the following:

displaying a lock screen interface in the second screen area;

displaying the main interface in the second screen area in response to an unlock command; and displaying the shortcut application icon of the target application program in the main interface.

In some embodiments, the main interface may include the dock bar, and the dock bar may be fixed to display in the main interface.

The operation for displaying the shortcut application icon of the target application program in the main interface may include the following:

displaying the shortcut application icon of the target application program in the dock bar of the main interface through a slide-in animation;

or, adding the shortcut application icon of the target application program to the dock bar of the main interface and adjusting a layout of the dock bar.

In some embodiments, the operation for displaying the shortcut application icon of the target application program in the dock bar of the main interface through a slide-in animation may include the following:

displaying the shortcut application icon of the target application program through the slide-in animation in the dock bar in case where the dock bar of the main interface does not include the default application icon of the target application program.

In some embodiments, the operation for displaying the shortcut application icon of the target application program in the main interface may further include the following:

adding a preset indicator around the default application icon to obtain the shortcut application icon, in case where the dock bar of the main interface includes the default application icon of the target application program. The preset indicator is configured to characterize or represent that the target application program was recently displayed in the first screen area.

In some embodiments, the operation for displaying the shortcut application icon of the target application program in the second screen area may include the following:

displaying the lock screen interface with the shortcut application icon in the second screen area.

In some embodiments, the operation for displaying the target application interface in the second screen area, in response to the trigger operation applied to the shortcut application icon, may include the following:

displaying the target application interface in the second screen area in response to the trigger operation applied to the shortcut application icon and a passed unlock verification (i.e., the unlock verification is successful).

In some embodiments, after displaying the target application interface in the second screen area in response to the trigger operation applied to the shortcut application icon, the method may further include the following:

removing the shortcut application icon of the target application program from the second screen area.

In some embodiments, after displaying the shortcut application icon of the target application program in the second screen area, the method may further include the following:

displaying an application interface of another application other than the target application program in the second screen area, in response to a startup command of the another application, and removing the shortcut application icon of the target application program from the second screen area.

In some embodiments, after displaying the application interface of the target application program in the second screen area in response to the trigger operation applied to the shortcut application icon, the method may further include the following:

stopping displaying the target application interface in the second screen area in response to the foldable screen terminal being switched from the folded state to the unfolded state;

displaying the shortcut application icon of the target application program in the first screen area; and displaying the target application interface in the first screen area in response to the trigger operation applied to the shortcut application icon.

In some embodiments, the operation for displaying the shortcut application icon of the target application program in the first screen area may include the following:

determining, based on application information of the target application program, whether the target application program supports resizing of the interface at runtime; and displaying the shortcut application icon of the target application program in the first screen area based on a determination that the target application program does not support adjusting the size of the target application interface at runtime.

In some embodiments, the method may further include the following:

displaying the target application interface of the target application program in the first screen area in case where the target application program supports resizing of the interface at runtime.

In some embodiments, the foldable screen terminal may be the inward foldable screen terminal. The first screen area and the second screen area may be independent screens, and the first screen area may support inward folding. When the inward foldable screen terminal is in the unfolded state, the first screen area and the second screen area may be exposed. When the inward foldable screen terminal is in the folded state, the second screen area may be exposed.

Or, the foldable screen terminal may be an outward foldable screen terminal, the first screen area and the second screen area may belong to an identical screen. The first screen area may be provided as a complete screen area, while the second screen area may be provided as a partial screen area.

In a possible scenario, after the user folds the foldable screen terminal, the terminal may stop being used. If the shortcut application icon of the target application program is displayed directly in the second screen area at this time, a touch by mistake may happen. Therefore, in a possible embodiment, when the foldable screen terminal is folded, the lock screen interface may be displayed first, and the shortcut application icon of the target application program may then be displayed after unlocking the lock screen, in order to reduce the touch by mistake. An embodiment may illustrate this method below.

Figure 7:
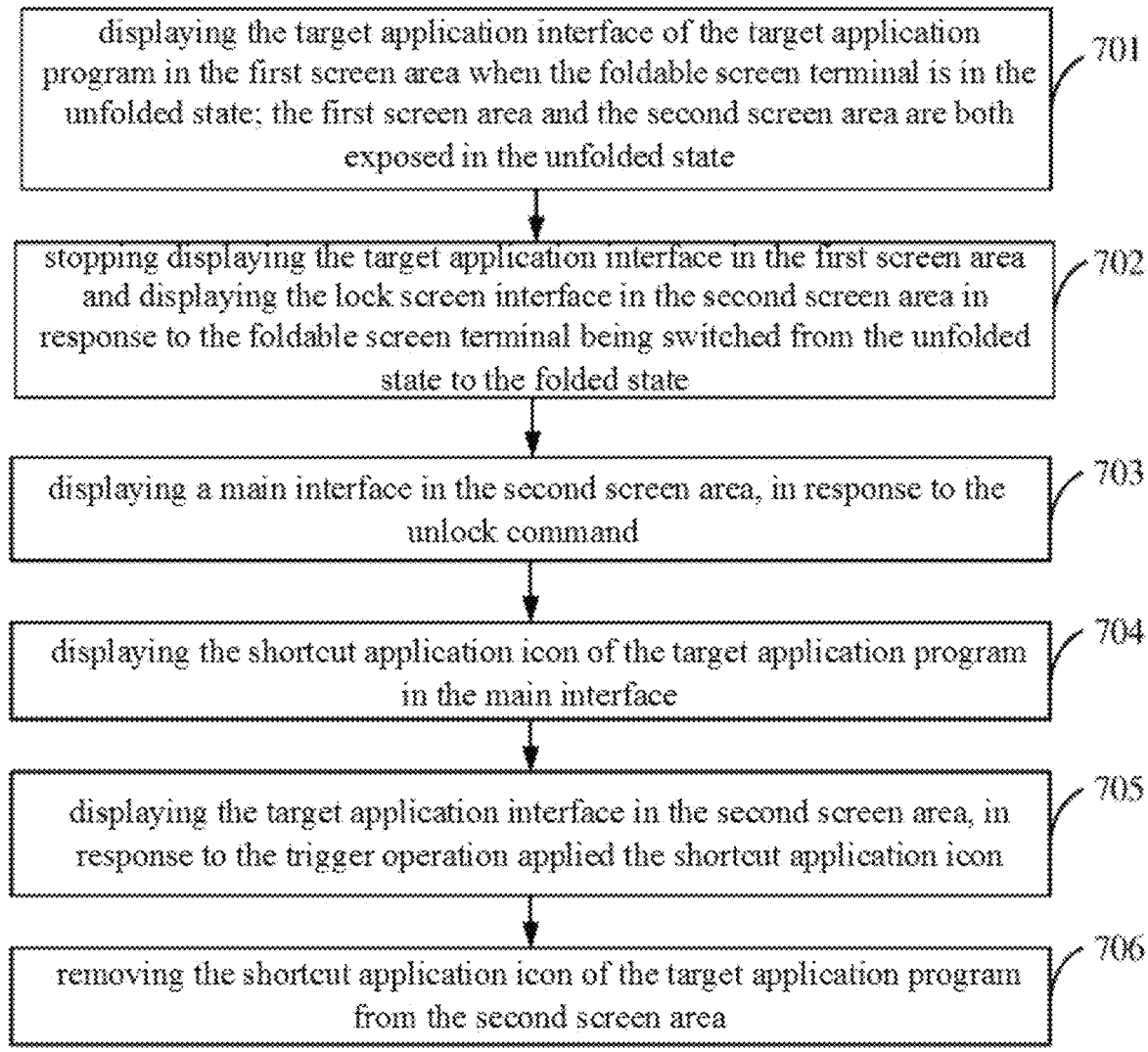
FIG. 7 is a flowchart of a method for displaying an application interface according to another embodiment of the present disclosure.

As shown in FIG. 7, a flowchart of a method for displaying an application interface according to another embodiment of the present disclosure is provided. The method is illustrated based on an example of implementing the foldable screen terminal as described above and the method may include the following operations at blocks illustrated in FIG. 7.

At block 701: displaying the target application interface of the target application program in the first screen area when the foldable screen terminal is in the unfolded state.

The implementation of the block 701 may refer to the block 501 above, and the embodiments of the present disclosure will not be repeated herein.

At block 702: stop displaying the target application interface in the first screen area and displaying the lock screen interface in the second screen area in response to the foldable screen terminal being switched from the unfolded state to the folded state.

In a possible embodiment, when the folding screen terminal is switched from the unfolded state to the folded state, the lock screen interface may be displayed in the second screen area in order to reduce the occurrence of mistakenly touching the shortcut application icon. Upon opening the lock screen interface, the user may be required to unlock the terminal through an unlocking operation before continuing to launch the target application program through the trigger operation applied to the shortcut application icon.

Figure 8:
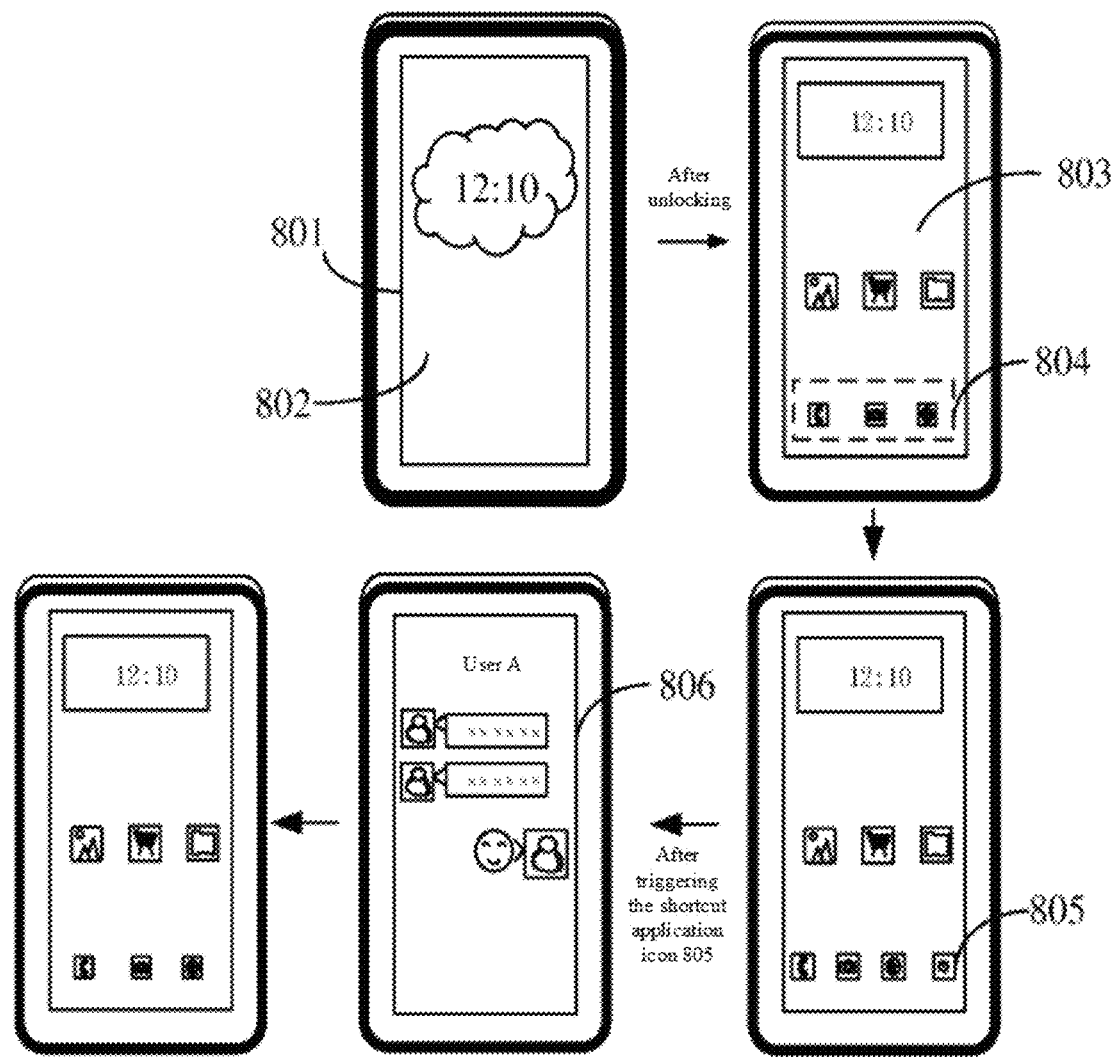
FIG. 8 is a schematic view illustrating an interface in a process of displaying an application interface according to another embodiment of the present disclosure.

In some embodiments, as shown in FIG. 8, when the folding screen terminal is switched from the unfolded state to the folded state, a lock screen interface 802 will be displayed in a second screen area 801.

At block 703: displaying the main interface in the second screen area in response to the unlock command.

In some embodiments, the unlock command may be at least one of the follows: a password command, a fingerprint command, or a face command, etc. When the password command is adopted, if a received password is the same as a preset password, the terminal may determine that the unlock command is received. When the fingerprint command is adopted, if a received fingerprint image is the same as a preset image, the terminal may determine that the unlock command is received. When the face command is adopted, if a received face image is the same as a preset image, the terminal may determine that the unlock command is received.

In a possible embodiment, in response to the terminal receiving the unlock command, the main interface may be displayed in the second screen area. In some embodiments, the main interface may include different application icons or different functional controls. Display forms of the application icons and the functional controls may be system-defaulted or user-defined. The present disclosure does not limit the display forms.

In some embodiments, as shown in FIG. 8, when the terminal receives the unlock command, a main interface 803 may be displayed in the second screen area 801.

At block 704: displaying the shortcut application icon of the target application program in the main interface.

In some embodiments, after displaying the main interface in the second screen area, the shortcut application icon of the target application program may be displayed at any position in the main interface. However, since variations in the way how the main interface is displayed may affect an efficiency of triggering the shortcut application icon, in another possible embodiment, the shortcut application icon of the target application program may be displayed at a fixed position in the main interface. In some embodiments, the main interface may include the dock bar, and the dock bar may be fixed to be displayed in the main interface so that the shortcut application icon of the target application program may be displayed in the dock bar of the main interface.

In a possible embodiment, the shortcut application icon may be directly displayed in the dock bar of the main interface to be triggered for displaying the target application interface. In some embodiments, when the shortcut application icon is added to the dock bar of the main interface, the layout of the dock bar may first be adjusted so that it may accommodate the shortcut application icon. For example, there may be three application icons provided in the original dock bar, before adding the shortcut application icon, an icon size of each of the three original application icons and a distance between two adjacent of the application icons may be adjusted first. Then the terminal may add the shortcut application icon to the dock bar after the layout is adjusted. Once the shortcut application icon is added, the size of each of the application icons and the distance between two adjacent of the application icons may be the same.

In some embodiments, in order to allow the user to instantly perceive a location of where the shortcut application icon is presented, the shortcut application icon may be displayed through an animation after the main interface is displayed in the second screen area. For example, in the dock bar of the main interface, the shortcut application icon of the target application program may be displayed through a slide-in animation. That is, by displaying the main interface in the second screen area, the terminal may display the animation of the shortcut application icon sliding into the dock bar. In some embodiments, the slide-in animation may be presented as sliding in from the right side of the dock bar, sliding in from the left side of the dock bar, or sliding in from the bottom of the dock bar. The present disclosure does not limit the specific form of the slide-in animation. In addition to the slide-in animation, the shortcut application icon may also be displayed through a dynamic blinking served as a reminder to the user.

In a possible embodiment, the way of displaying the shortcut application icon in the dock bar may depend on whether or not the default application icon of the target application program is provided in the dock bar.

In some embodiments, in condition that the dock bar of the main interface does not include the default application icon of the target application program, the shortcut application icon of the target application program may be displayed in the dock bar through the slide-in animation.

When the dock bar does not include the default application icon of the target application program, the shortcut application icon may slide into the dock bar, or the layout of the dock bar may be adjusted to add the shortcut application icon to the dock bar. That is, a new shortcut application icon may be added to the dock bar so that the shortcut application icon may be displayed in a different position comparing to the default application icon. However, the shortcut application icon may be displayed in a same form comparing to the default application icon.

In some embodiments, when the dock bar of the main interface includes the default application icon of the target application program, the preset indicator may be added around the default application icon to obtain the shortcut application icon, and the preset indicator may be configured to characterize or represent that the target application program was recently displayed in the first screen area.

When the default application icon of the target application program is provided in the dock bar, the shortcut application icon may be displayed in a different form comparing to the default application icon. Therefore, the shortcut application icon may be characterized by adding the preset indicator around the default application icon. In some embodiments, the preset indicator may be added to a lower left corner, an upper left corner, a center, an upper right corner, and a lower right corner of the default application icon.

In some embodiments, the preset indicator may be an indicator with a preset shape, such as a triangle, and a star, etc., or an indicator with a preset pattern, such as a thumbnail of the first screen area, a thumbnail of the default application icon, etc. The preset indicator may be either statically or dynamically displayed around the default application icon.

In some embodiments, as shown in FIG. 8, after receiving the unlock command, since the dock bar 804 does not include the default application icon, the terminal may adjust the layout of the dock bar 804 to add another shortcut application icon 805 in the dock bar 804 of the main interface.

Figure 9:
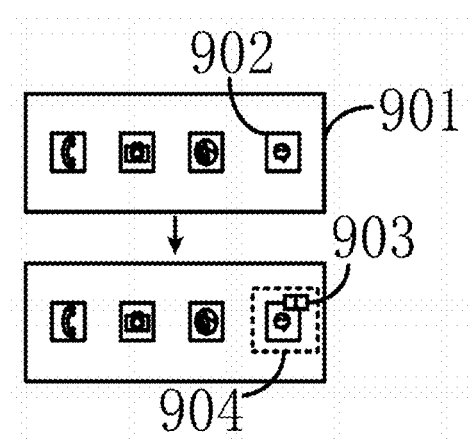
FIG. 9 is a schematic view illustrating an interface in a process of displaying shortcut application icons according to an embodiment of the present disclosure.

In some embodiments, as shown in FIG. 9, when the unlock command is received, since a dock bar 901 includes a default application icon 902, the terminal may add a preset indicator 903 to the upper right corner of the default application icon 902 to obtain a shortcut application icon 904.

At block 705: in response to the trigger operation applied to the shortcut application icon, the target application interface may be displayed in the second screen area.

The implementation of the block 705 may refer to the block 503 above, and the embodiments of the present disclosure will not be repeated herein.

At block 706: removing the shortcut application icon of the target application program from the second screen area.

In order to facilitate the user to re-launch the target application program, the shortcut application icon may be displayed in the dock bar. If the shortcut application icon is continuously displayed, shortcut application icons corresponding to different applications may be displayed in the dock bar. In this way, too many application icons may be displayed in the dock bar. Therefore, a removal process may be provided in some embodiments of the present disclosure, i.e. after the user triggers the shortcut application icon and the target application interface is displayed in the second screen area, the terminal may remove the shortcut application icon from the dock bar.

In some embodiments, a removal method may be determined by a form in which the shortcut application icon is displayed. If the default application icon is not initially provided in the dock bar and the shortcut application icon is displayed in the dock bar through the slide-in animation, the shortcut application icon in the dock bar may be deleted at a time of removal. If the default application icon is initially provided in the dock bar and the shortcut application icon is an icon composed of the default application icon and the preset indicator, the preset indicator may be deleted and the shortcut application icon may be restored to the default application icon at the time of removal.

In some embodiments, as shown in FIG. 8, when the trigger operation applied to the shortcut application icon is received, the terminal may display a target application interface 806 in the second screen area. At this time, the shortcut application icon 805 in the dock bar 804 may be removed, and only default application icons of other applications that are displayed initially in the dock bar 804 may be remained.

In this embodiment, after stopping displaying the target application interface in the first screen area, the lock screen interface may be displayed first to reduce the occurrence of touching the shortcut application icon mistakenly. After the user executes the unlock command, the terminal will display the shortcut application icon in the dock bar of the main interface, facilitating the user to trigger the shortcut application icon promptly and improving an efficiency of displaying the target application interface.

Further in this embodiment, after displaying the target application interface in the second screen area, the terminal may remove the shortcut application icon in the second screen area to avoid displaying shortcut application icons of multiple applications simultaneously and make sure that triggering the shortcut application icon of the target application program is not be affected.

In another possible embodiment, after the shortcut application icon of the target application program is displayed in the second screen area, the user may not trigger the shortcut application icon, and instead launch the another application. Therefore, a corresponding application interface of the another application may be displayed in the second screen area. If the user launches the another application, indicating that the user may not continue using the target application program, the shortcut application icon displayed in the second screen area may be removed.

In some embodiments, in response to a startup command of the another application other than the target application program, an application interface of the another application may be displayed in the second screen area and the shortcut application icon of the target application program may be removed from the second screen area. The startup command may be a trigger command, and a voice command, etc. When the another application is launched, the application interface of the another application may be displayed in the second screen area correspondingly. Meanwhile, the shortcut application icon of the target application program may be removed from the second screen area. The implementation of the removal method may refer to the block 706 above, and the embodiments of the present disclosure will not be repeated herein.

In the aforementioned embodiments, after the foldable screen terminal is switched from the unfolded state to the folded state, the lock screen interface may be displayed in the second screen area. The target application interface may be displayed in the second screen area by triggering the shortcut application icon again after the unlock command, and the process may be cumbersome. Therefore, in order to further improve the efficiency of displaying the target application interface, in a possible embodiment, after the foldable screen terminal is switched from the unfolded state to the folded state and the target application interface is stopped being displayed in the first screen area, the shortcut application icon may be displayed and triggered based on following operations.

Operation 1: displaying the lock screen interface with the shortcut application icon in the second screen area.

In order to avoid unlocking before triggering the shortcut application icon, in a possible embodiment, the lock screen interface with the shortcut application icon may be directly displayed in the second screen area. Therefore, the target application program may be launched directly by triggering the shortcut application icon provided in the lock screen interface.

Figure 10:
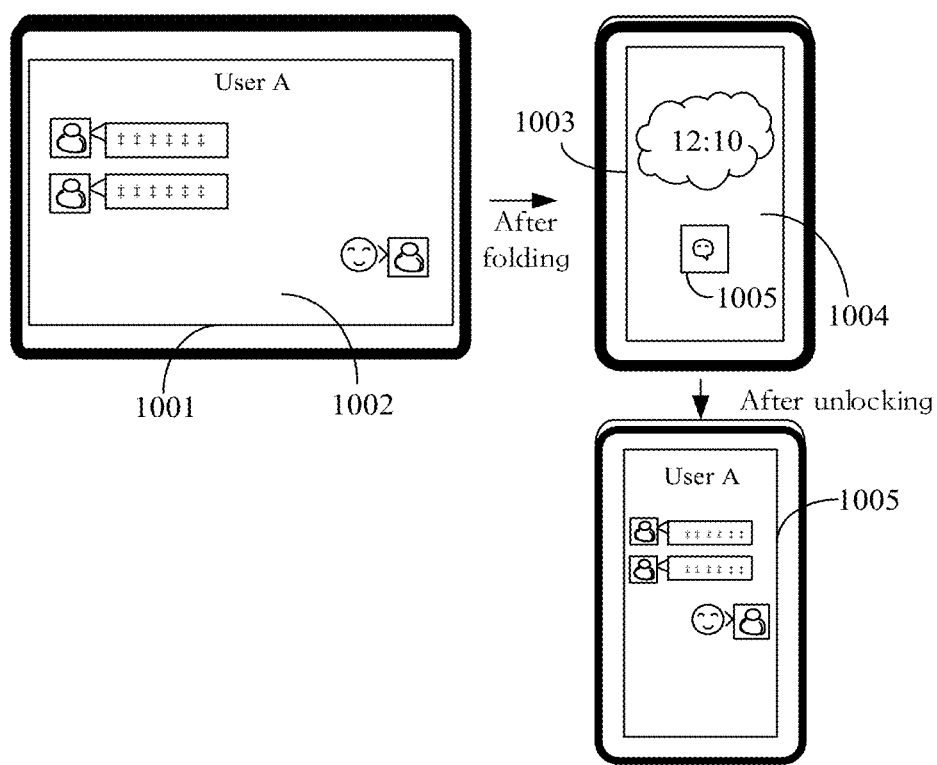
FIG. 10 is a schematic view illustrating an interface in a process of displaying an application interface according to another embodiment of the present disclosure.

In some embodiments, as shown in FIG. 10, when the foldable screen terminal is switched from the unfolded state to the folded state, a target application interface 1002 may be stopped being displayed in a first screen area 1001, a lock screen interface 1004 may be displayed in a second screen area 1003, and a shortcut application icon 1005 may be provided in the lock screen interface 1004.

Operation 2: in response to a trigger operation applied to the shortcut application icon and the passed unlock verification, displaying the target application interface in the second screen area.

In a possible embodiment, the terminal may be unlocked through a fingerprint. When the trigger operation applied to the shortcut application icon provided in the lock screen interface is received, the terminal may collect a fingerprint image and match the collected fingerprint image with a preset fingerprint image. If a matching is successful, the terminal may be unlocked and the target application interface may be displayed directly in the second screen area. If the matching fails, the user may be prompted to provide the fingerprint again. If the matching fails multiple times, the terminal may be unlocked by inputting a password or a face image, instead. Once the terminal is successfully unlocked, the target application interface may be directly displayed.

In some embodiments, as shown in FIG. 10, when the user triggers the shortcut application icon 1005 in the lock screen interface 1004, the target application interface 1002 may be displayed in the second screen area 1003.

In the aforementioned embodiments, a process of switching from displaying in the first screen area to displaying in the second screen area is illustrated. In a possible application scenario, there may also be a situation in which a display is switched from the second screen area to the first screen area. The situation will be illustrated in the following embodiment.

Figure 11:
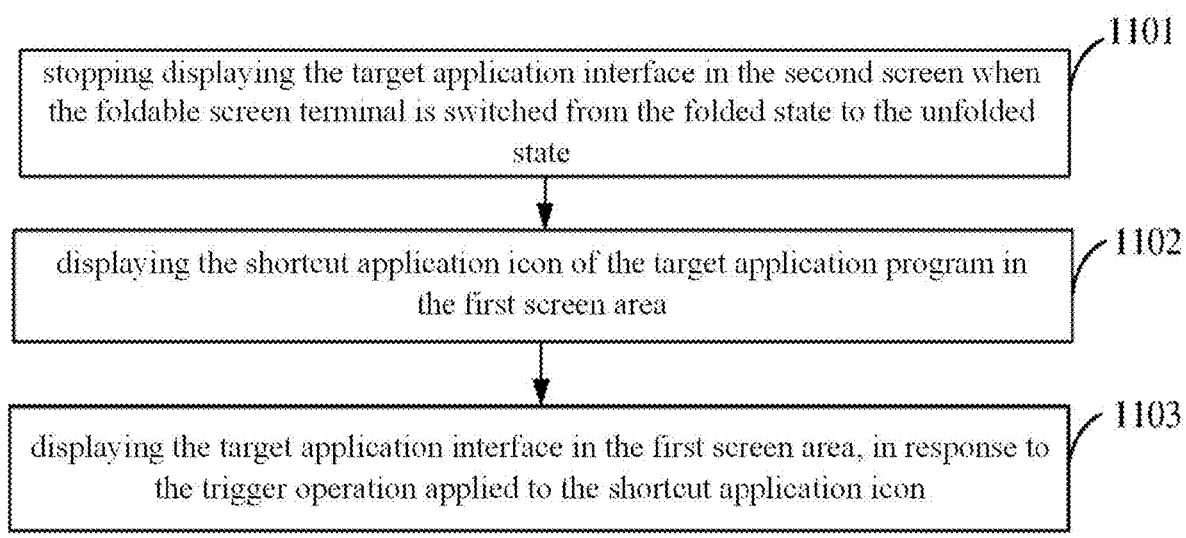
FIG. 11 is a flowchart of a method for displaying an application interface according to another embodiment of the present disclosure.

As shown in FIG. 11, a flowchart of a method for displaying an application interface according to another embodiment of the present disclosure is provided. The method is illustrated based on an implementation of above-described foldable screen terminal, and the method may include operations executed by the following blocks.

At block 1101: stop displaying the target application interface in the second screen when the foldable screen terminal is switched from the folded state to the unfolded state.

In a possible embodiment, when the foldable screen terminal is switched from the folded state to the unfolded state, the first screen area may be provided as a plane. Meanwhile, the terminal may stop displaying the target application interface in the second screen area, and instead displaying the target application interface in the first screen area.

Figure 12:
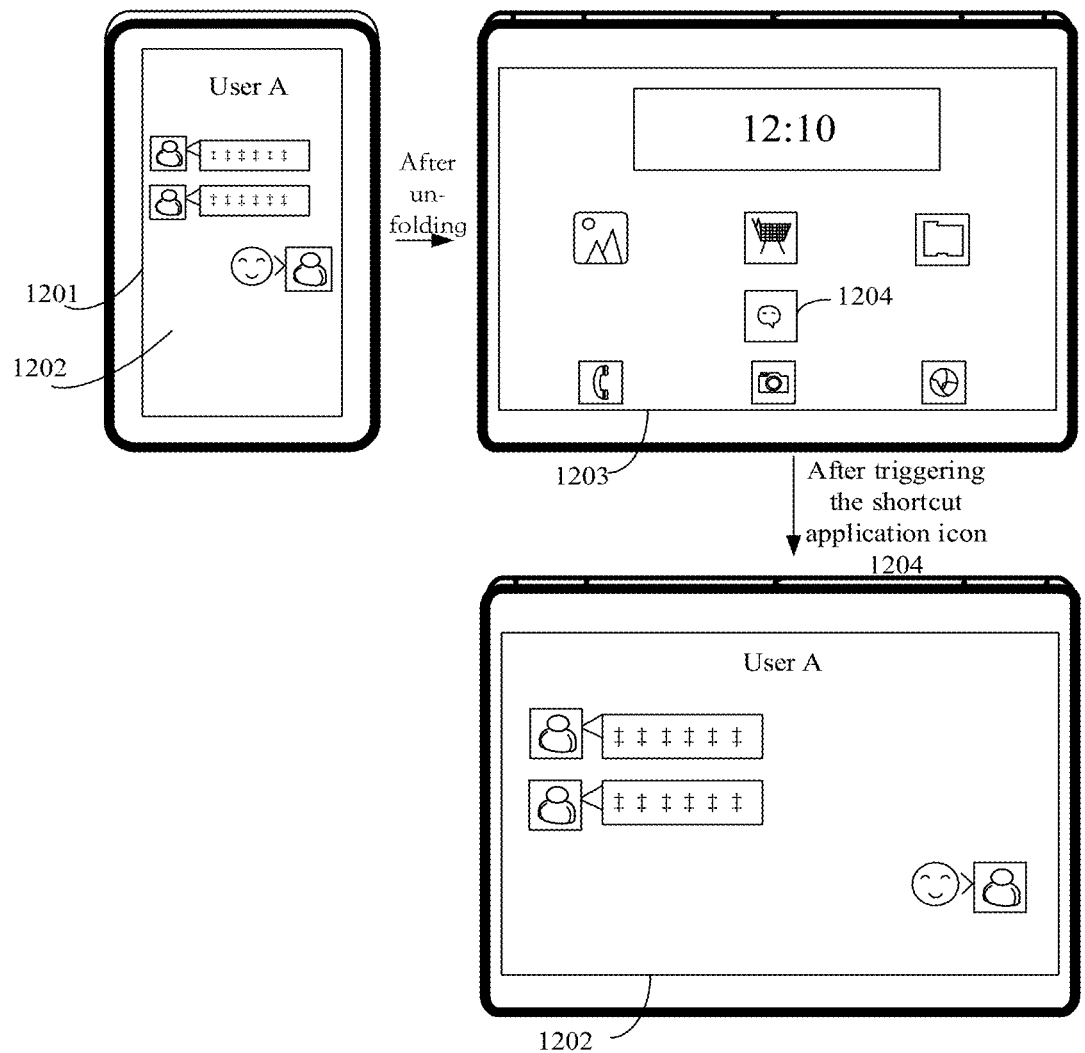
FIG. 12 is a schematic view illustrating an interface in a process of displaying application interfaces according to another embodiment of the present disclosure.

In some embodiments, as shown in FIG. 12, after the foldable screen terminal is switched from the folded state to the unfolded state, the terminal may stop displaying a target application interface 1202 in a second screen area 1201.

In some embodiments, in another possible embodiment, during the process of switching the foldable screen terminal from the folded state to the unfolded state, the target application interface may be stopped being displayed in the second screen area when the folded screen terminal is in the non-folded state. In other words, when the included angle between two of parts of the first screen area is greater than the first angle, the terminal may stop displaying the target application interface in the second screen area. In addition, after the included angle of the first screen area is greater than the first angle, the terminal is in a not fully unfolded state (i.e. partially unfolded state). When the terminal is being unfolded to a certain extent, the first screen area may be configured to display. In some embodiments, when the included angle of the first screen area is greater than the second angle, the first screen area may be configured to display. In some embodiments, the second angle may be greater than the first angle, for example, the second angle may be 150°.

At block 1102: displaying the shortcut application icon of the target application program in the first screen area.

In a possible embodiment, when the foldable screen terminal is in the unfolded state, the user may continue to use the terminal. Therefore, when the terminal is switched from displaying in the second screen area to displaying in the first screen area, the shortcut application icon of the target application program may be displayed directly in the main interface of the first screen area, without the lock screen being displayed. An operation of displaying the shortcut application icon of the target application program in the first screen area may refer to the block 704 above, and will not be repeated in this embodiment.

In another possible embodiment, due to switching from displaying in the second screen area to displaying in the first screen area, a size of the interface being displayed may become greater. The target application program may support adjusting the size of the interface being displayed at runtime. In other words, when switching from displaying in the second screen area to displaying in the first screen area, the terminal may stop displaying the target application interface in the second screen area, and instead, displaying the application interface directly in the first screen area.

Therefore, after stopping displaying the target application interface in the second screen area, it may be first determined whether the target application program supports adjusting the size of the interface being displayed at runtime. In some embodiments, whether the target application program supports adjusting the size of the interface being displayed at runtime may be determined based on the application information of the target application program.

The terminal may obtain the application information (such as a name of an application package) of the target application program in real time to determine whether the target application program supports adjusting the size of the interface being displayed at runtime. In some embodiments, the terminal may pre-store a list of applications that support adjusting the size of the interface being displayed at runtime. When the terminal acquires an application package name of the target application program, whether the target application program is included in the list of applications that support adjusting the size of the interface being displayed at runtime may be determined according to the acquired application package name. If the application is included in the list, the target application program may be able to resize the interface at runtime. If the application is not included in the list, the target application program may not be able to resize of the interface at runtime. It is to be noted that some other methods may also be available to determine whether the target application program supports adjusting the size of the interface being displayed at runtime. The present disclosure only illustrates a determination method and does not aim to provide specific limitations.

In some embodiments, based on a determination that the target application program does not support adjusting the size of the target application interface at runtime, the shortcut application icon of the target application program may be displayed in the first screen area.

Based on a determination that the target application program does not support adjusting the size of the target application interface at runtime, if the interface is displayed directly through the first screen area, the size of the interface being displayed in the first screen area may be the same as the size of the interface being displayed in the second screen area. As a result, more blank space having nothing being displayed therein may be remained in the first screen area and thus a performance of the display of the interface of the target application program may be affected. Therefore, based on a determination that the target application program does not support adjusting the size of the target application interface at runtime, the shortcut application icon of the target application program may be displayed in the first screen area, facilitating the user to trigger and re-launch the target application program, so that the size of the target application interface may match the size of the first screen area.

In some embodiments, as shown in FIG. 12, based on a determination that the target application program does not support adjusting the size of the target application interface at runtime, the terminal will display a shortcut application icon 1204 in a first screen area 1203.

In some embodiments, when the target application program supports adjusting the size of the interface being displayed at runtime, the target application interface of the target application program may be displayed in the first screen area.

When the target application program supports adjusting the size of the interface being displayed at runtime, the target application interface of the target application program may be directly displayed in the first screen area. In some embodiments, a first application interface of the target application program may be pre-stored in the terminal and the first application interface may be adapted to the display size of the first screen area. A second application interface of the target application program may be pre-stored in the terminal and the second application interface may be adapted to the display size of the second screen area. When the target application interface is switched to be displayed in the first screen area, the first application interface of the target application program may be directly displayed in the first screen area.

At block 1103: in response to the trigger operation applied to the shortcut application icon, displaying the target application interface in the first screen area.

When the shortcut application icon is triggered, the terminal may display the target application interface in the first screen area. The target application interface provided in the first screen area may display a same content as what was displayed when the target application interface was stopped displaying in the second screen area.

In some embodiments, after the target application interface is displayed in the first screen area, the shortcut application icon in the first screen area may be removed. A removal method may refer to the method of removing the shortcut application icon from the second screen area in the block 706 above, and the embodiments of the present disclosure will not be repeated herein.

Similarly, if the user launches the another application after the shortcut application icon of the target application program is displayed in the first screen area, a user interface of the another application may be displayed in the first screen area and the shortcut application icon in the first screen area may be removed.

In some embodiments, as shown in FIG. 12, after receiving a trigger operation applied to the shortcut application icon 1204, the terminal will display the target application interface 1202 in the first screen area 1203.

In some embodiments of the present disclosure, when switching from displaying in the second screen area to displaying in the first screen area, in some embodiments, whether the target application program supports adjusting the size of the interface being displayed at runtime may be determined based on the application information of the target application program. If the target application program supports adjusting the size of the interface being displayed at runtime, the target application interface may be displayed directly in the first screen area to improve the efficiency of displaying the target application interface. Based on a determination that the target application program does not support adjusting the size of the target application interface at runtime, the shortcut application icon may be displayed in the first screen area to avoid looking for the default application icon again, so that the efficiency of displaying the target application interface may be improved.

Figure 13:
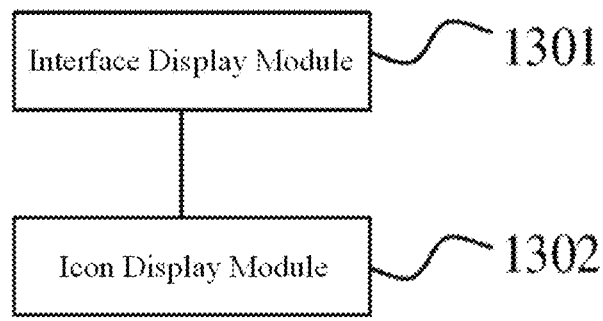
FIG. 13 is a structural block view of a device for displaying an application interface according to an embodiment of the present disclosure.

As shown in FIG. 13, a structural block view of a device for displaying an application interface according to an embodiment of the present disclosure is illustrated. The device may be implemented as the terminal or a part of the terminal by a software, a hardware, or a combination of the software and the hardware. The device may be configured as a foldable screen terminal and the foldable screen terminal may include a first screen area and a second screen area. A size of the first screen area may be greater than a size of the second screen area. The device may include the following modules.

An interface display module 1301 is configured to display the target application interface of the target application program in the first screen area in a case where the foldable screen terminal is in the unfolded state.

An icon display module 1302 is configured to stop displaying the target application interface in the first screen area and display the shortcut application icon of the target application program in the second screen area in response to the foldable screen terminal being switched from the unfolded state to the folded state. The shortcut application icon may be displayed in a manner different from the default application icon of the target application program.

The interface display module 1301 is further configured to display the target application interface in the second screen area in response to a trigger operation applied to the shortcut application icon.

In some embodiments, the icon display module 1302 may be further configured to perform the following operations:
displaying the lock screen interface in the second screen area;
displaying the main interface in the second screen area in response to the unlock command; and
displaying the shortcut application icon of the target application program in the main interface.

In some embodiments, the main interface may include the dock bar, and the dock bar may be fixedly displayed in the main interface.

In some embodiments, the icon display module 1302 may be further configured to perform the following operations:
displaying the shortcut application icon of the target application program in the dock bar of the main interface through the slide-in animation;
or, adding the shortcut application icon of the target application program to the dock bar of the main interface and adjusting the layout of the dock bar.

In some embodiments, the icon display module 1302, may be further configured to perform the following operation:
displaying the shortcut application icon of the target application program in the dock bar through the slide-in animation in case where the dock bar of the main interface does not include the default application icon of the target application program.

In some embodiments, the icon display module 1302, may be further configured to perform the following operation:
adding the preset indicator around the default application icon to obtain the shortcut application icon, in case where the dock bar of the main interface includes the default application icon of the target application program. The preset indicator is configured to characterize or represent that the target application program was recently displayed in the first screen area.

In some embodiments, the icon display module 1302 may be further configured to perform the following operation:
displaying the lock screen interface with the shortcut application icon in the second screen area.

In some embodiments, the interface display module 1301 may be further configured to perform the following operation:
displaying the target application interface in the second screen area in response to a trigger operation applied to the shortcut application icon and the passed unlock verification.

In some embodiments, the device may further include the following module.

A removal module is configured to remove the shortcut application icon of the target application program from the second screen area.

In some embodiments, the removal module may be further configured to perform the following operations:
displaying an application interface of another application other than the target application in the second screen area in response to a startup command of the another application and removing the shortcut application icon of the target application program from the second screen area.

In some embodiments, the device may further include the following modules.

A stop display module is configured to stop displaying the target application interface in the second screen area in response to the foldable screen terminal being switched from the folded state to the unfolded state.

The icon display module 1302 is further configured to display the shortcut application icon of the target application program in the first screen area.

The interface display module 1301 is further configured to display the target application interface in the first screen area in response to a trigger operation applied to the shortcut application icon.

In some embodiments, the icon display module 1302 may be further configured to perform the following operations:

determining, based on the application information of the target application program, whether the target application program supports adjusting the size of the interface being displayed at runtime; and displaying the shortcut application icon of the target application program in the first screen area based on a determination that the target application program does not support adjusting the size of the target application interface at runtime.

In some embodiments, the interface display module may be further configured to perform the following operation:

displaying the target application interface of the target application program in the first screen area in case where the target application program supports resizing the interface being displayed at runtime.

In some embodiments, the foldable screen terminal may be the inward foldable screen terminal. The first screen area and the second screen area may be independent screens, and the first screen area may support inward folding. When the inward foldable screen terminal is in the unfolded state, the first screen area and the second screen area may be exposed. When the inward foldable screen terminal is in the folded state, the second screen area may be exposed.

Or, the foldable screen terminal may be an outward foldable screen terminal, the first screen area and the second screen area may belong to an identical screen. The first screen area may be provided as a complete screen area and the second screen area may be provided as a partial screen area.

In summary, in some embodiments of the present disclosure, when the application interface of the target application program is displayed in the first screen area of a greater size, if the terminal is folded, the target application interface of the target application program may be stopped displaying in the first screen area and instead be displayed in the second screen area. At this time, the shortcut application icon of the target application program may be provided in the second screen area. The user may cause the terminal to display the target application interface in the second screen area by triggering the shortcut application icon so that the user may not need to look for the default application icon again to launch the application after the terminal is folded. The method provided in some embodiments of the present disclosure may be adopted for user's convenience to continue to use the target application program in the second screen area, so that the application relay between different screens in the foldable screen terminal may be realized, and thus an efficiency of launching the application interface may be improved.

Some embodiments of the present disclosure may also provide a computer-readable medium. The computer-readable medium may store at least one instruction and the at least one instruction may be loaded and executed by a processor to implement methods of displaying an application interface as described in the embodiments above.

The embodiments of the present disclosure may provide a computer program product. The computer program product may include at least one computer instruction. The at least one computer instruction may be stored in a computer-readable storage medium. A processor of a computer device may read the at least one computer instruction from the computer-readable storage medium. The processor may execute the at least one computer instruction so that the computer device may execute the methods of displaying an application interface provided in some embodiments of the present disclosure above.

The skilled in the art should be noted that, in one or more examples illustrated above, functionalities described in the present disclosure may be implemented using hardware, software, firmware, or any combination thereof. When the functionalities are implemented using the software, the functionalities may be stored in the computer-readable medium or transmitted as one or more instructions or codes on the computer-readable medium. The computer-readable medium may include a computer storage medium and a communication medium. The communication medium may include any medium that facilitates a transmission of a computer program from one location to another. The computer storage medium may be any available medium that can be accessed by a general computer or a specialized computer.

What have been mentioned above are only some optional embodiments of the present disclosure and are not intended to limit the scope of the present disclosure. Any modifications, equivalent substitutions, improvements, etc. made under the spirit and principles of the present disclosure shall be included in the scope of protection of the present disclosure.

What is claimed is:

1. A method for displaying an application interface, the method being performed by a foldable screen terminal, the foldable screen terminal comprising a first screen area and a second screen area, and a size of the first screen area being greater than a size of the second screen area;

the method comprising:

displaying a target application interface of a target application program in the first screen area, in a case where the foldable screen terminal is in an unfolded state;

stopping displaying the target application interface in the first screen area, and displaying a shortcut application icon of the target application program in the second screen area, in a case where the foldable screen terminal is switched from the unfolded state to a folded state, wherein the shortcut application icon is displayed in a manner different from a default application icon of the target application program; and displaying the target application interface in the second screen area, in response to a trigger operation applied to the shortcut application icon;

wherein the displaying the shortcut application icon of the target application program in the second screen area, comprises:

displaying a lock screen in the second screen area;

displaying a main interface in the second screen area, in response to an unlock command; and displaying the shortcut application icon of the target application program in the main interface; and after the displaying the target application interface in the second screen area in response to the trigger operation applied to the shortcut application icon, the method comprises:

removing the shortcut application icon of the target application program from the second screen area.

2. The method as claimed in claim 1, wherein the main interface comprises a dock bar and the dock bar is fixedly displayed in the main interface;

wherein displaying the shortcut application icon of the target application program in the main interface comprises:

displaying the shortcut application icon of the target application program through a slide-in animation in the dock bar of the main interface;

or, adding the shortcut application icon of the target application program to the dock bar of the main interface and adjusting a layout of the dock bar.

3. The method as claimed in claim 2, wherein displaying the shortcut application icon of the target application program through the slide-in animation in the dock bar of the main interface comprises:

displaying the shortcut application icon of the target application program in the dock bar through the slide-in animation in a case where the dock bar of the main interface does not comprise the default application icon of the target application program.

4. The method as claimed in claim 2, wherein displaying the shortcut application icon of the target application program in the main interface further comprises:

adding a preset indicator around the default application icon to obtain the shortcut application icon in a case where the dock bar of the main interface comprises the default application icon of the target application program, wherein the preset indicator is configured to represent that the target application program was recently displayed in the first screen area.

5. The method as claimed in claim 1, wherein displaying the shortcut application icon of the target application program in the second screen area comprises:

displaying the lock screen, which comprises the shortcut application icon, in the second screen area.

6. The method as claimed in claim 5, wherein displaying the target application interface in the second screen area in response to the trigger operation applied to the shortcut application icon comprises:

displaying the target application interface in the second screen area, in response to the trigger operation applied to the shortcut application icon and a passed unlock verification.

7. The method as claimed in claim 1, wherein after displaying the shortcut application icon of the target application program in the second screen area, the method further comprises:

displaying an application interface of another application other than the target application program in the second screen area, and removing the shortcut application icon of the target application program from the second screen area, in response to a startup command of the another application.

8. The method as claimed in claim 1, wherein after displaying the target application interface in the second screen area in response to the trigger operation applied to the shortcut application icon, the method further comprises:

stopping displaying the target application interface in the second screen area in a case where the foldable screen terminal is switched from the folded state to the unfolded state;

displaying the shortcut application icon of the target application program in the first screen area; and displaying the target application interface in the first screen area, in response to the trigger operation applied to the shortcut application icon.

9. The method as claimed in claim 8, wherein displaying the shortcut application icon of the target application program in the first screen area comprises:

determining, based on application information of the target application program, whether the target application program supports adjusting a size of the target application interface at runtime; and displaying the shortcut application icon of the target application program in the first screen area based on a determination that the target application program does not support adjusting the size of the target application interface at runtime.

10. The method as claimed in claim 9, further comprising:

displaying the target application interface of the target application program in the first screen area based on a determination that the target application program supports adjusting the size of the target application interface at runtime.

11. The method as claimed in claim 8, wherein the target application interface provided in the first screen area displays a same content as what was displayed when the target application interface was stopped displaying in the second screen area.

12. The method as claimed in claim 1, wherein the foldable screen terminal is an inward foldable screen terminal, the first screen area and second screen area are independent screens, and the first screen area supports being folded inward; in a case where the inward foldable screen terminal is in the unfolded state, the first screen area and the second screen area are exposed; and in a case where the inward foldable screen terminal is in the folded state, the second screen area is exposed;

or, the foldable screen terminal is an outward foldable screen terminal, the first screen area and second screen area belong an identical screen; the first screen area is provided as a complete screen area and the second screen area is provided as a partial screen area.

13. The method as claimed in claim 1, wherein the removing the shortcut application icon of the target application program from the second screen area comprises:

removing the shortcut application icon of the target application program from the main interface of the second screen area, such that the shortcut application icon of the target application program is disappeared after the second screen area is redisplaying the main interface.

14. A terminal, comprising a processor and a memory; wherein the memory stores at least one instruction; when the at least one instruction is executed by the processor, the processor is caused to perform a method for displaying an application interface; the method is performed by a foldable screen terminal, the foldable screen terminal comprises a first screen area and a second screen area, and a size of the first screen area is greater than a size of the second screen area; the method comprises:

displaying a target application interface of a target application program in the first screen area, in a case where the foldable screen terminal is in an unfolded state;

stopping displaying the target application interface in the first screen area, and displaying a shortcut application icon of the target application program in the second screen area, in a case where the foldable screen terminal is switched from the unfolded state to a folded state, wherein the shortcut application icon is displayed in a manner different from a default application icon of the target application program; and displaying the target application interface in the second screen area, in response to a trigger operation applied to the shortcut application icon;

wherein the displaying the shortcut application icon of the target application program in the second screen area, comprises:

displaying a lock screen in the second screen area;

displaying a main interface in the second screen area, in response to an unlock command; and displaying the shortcut application icon of the target application program in the main interface; and after the displaying the target application interface in the second screen area in response to the trigger operation applied to the shortcut application icon, the method comprises:

removing the shortcut application icon of the target application program from the second screen area.

15. The terminal as claimed in claim 14, wherein displaying the shortcut application icon of the target application program in the second screen area comprises:

displaying the lock screen, which comprises the shortcut application icon, in the second screen area.

16. The terminal as claimed in claim 15, wherein displaying the target application interface in the second screen area in response to the trigger operation applied to the shortcut application icon comprises:

displaying the target application interface in the second screen area, in response to the trigger operation applied to the shortcut application icon and a passed unlock verification.

17. A non-transitory computer-readable storage medium, wherein the non-transitory computer-readable storage medium stores at least one instruction; when the at least one instruction is executed by a processor, the processor is caused to perform a method for displaying an application interface; the method is performed by a foldable screen terminal, the foldable screen terminal comprises a first screen area and a second screen area, and a size of the first screen area is greater than a size of the second screen area; the method comprises:

displaying a target application interface of a target application program in the first screen area, in a case where the foldable screen terminal is in an unfolded state;

stopping displaying the target application interface in the first screen area, and displaying a shortcut application icon of the target application program in the second screen area, in a case where the foldable screen terminal is switched from the unfolded state to a folded state, wherein the shortcut application icon is displayed in a manner different from a default application icon of the target application program; and displaying the target application interface in the second screen area, in response to a trigger operation applied to the shortcut application icon;

wherein the displaying the shortcut application icon of the target application program in the second screen area, comprises:

displaying a lock screen in the second screen area;

displaying a main interface in the second screen area, in response to an unlock command; and displaying the shortcut application icon of the target application program in the main interface; and after the displaying the target application interface in the second screen area in response to the trigger operation applied to the shortcut application icon, the method comprises:

removing the shortcut application icon of the target application program from the second screen area.

18. The non-transitory computer-readable storage medium as claimed in claim 17, wherein displaying the shortcut application icon of the target application program in the second screen area comprises:

displaying the lock screen, which comprises the shortcut application icon, in the second screen area.

* * * * *